CIRCUIT INTERRUPTERS

Filed Dec. 29, 1951 7 Sheets-Sheet 1

WITNESSES:
John E. Healy
W. R. Crout

INVENTORS
Roswell C. Van Sickle
and Russell E. Frink.
BY
Ralph H Swingle
ATTORNEY Dec. 20, 1955 R. C. VAN SICKLE ET AL 2,727,963

CIRCUIT INTERRUPTERS

Filed Dec. 29, 1951 7 Sheets-Sheet 2

WITNESSES:
E. A. McCloskey
W. R. Crout

INVENTORS
Roswell C. Van Sickle
and Russell E. Frink.
BY
Ralph H. Swingle
ATTORNEY WITNESSES:
E. A. McCloskey.
W. R. Crout INVENTORS
Roswell C. Van Sickle
and Russell E. Frink.
BY
Ralph H. Swingle
ATTORNEY WITNESSES:
John E. Healy
W. R. Crout INVENTORS
Roswell C. Van Sickle
and Russell E. Frink.
BY
Ralph H Swingle
ATTORNEY WITNESSES:
John E. Healy
W. R. Crout INVENTORS
Roswell C. Van Sickle
and Russell E. Frink.
BY
Ralph H. Swingle
ATTORNEY INVENTORS
Roswell C. Van Sickle
and Russell E. Frink
BY
Ralph H Swingle
ATTORNEY WITNESSES:
E. A. McCloskey.
W. R. Crout INVENTORS
Roswell C. Von Sickle
and Russell E. Frink.
BY
Ralph H. Swingle
ATTORNEY United States Patent Office 2,727,963
Patented Dec. 20, 1955

2,727,963

CIRCUIT INTERRUPTERS

Roswell C. Van Sickle and Russell E. Frink, Pittsburgh, Pa., assignors to Westinghouse Electric Corporation, East Pittsburgh, Pa., a corporation of Pennsylvania Application December 29, 1951, Serial No. 264,046

24 Claims. (Cl. 200—147)

This invention relates to circuit interrupters, and, more particularly, to arc-extinguishing structures therefor.

It is a general object of our invention to provide an improved circuit interrupter of improved high-voltage withstanding ability, so that the performance of the interrupter, as a whole, is considerably increased.

A more specific object of our invention is to provide an improved arc-extinguishing structure for a circuit interrupter of the type employing a U-shaped or an H-shaped magnet yoke, in which electrostatic stress conditions are improved between the pole plates of the magnet and the front or outer arcing horn of the device to prevent flashover therebetween under conditions of high voltage stress.

A further object is to provide an economical means, easily manufacturable and quickly assembled within the circuit interrupter, without increasing the size of the interrupter or affecting the operation thereof deleteriously, which will relieve the high voltage electrostatic stress conditions existing between the U-shaped blowout magnet and the front arcing horn of the device.

Although certain features of our invention are particularly adaptable to relieving the electrostatic stress conditions between a U-shaped blowout magnet and an outer stationary arc horn, nevertheless certain features of the invention have applicability to an interrupter in which an outer stationary arc horn is not employed and where conducting portions secured to and movable with the movable contact arm may be adapted to relieve conditions of high-voltage stress.

Further objects of our invention will be readily apparent upon reading the following specification, taken in conjunction with the drawings, in which.

Figure 1:
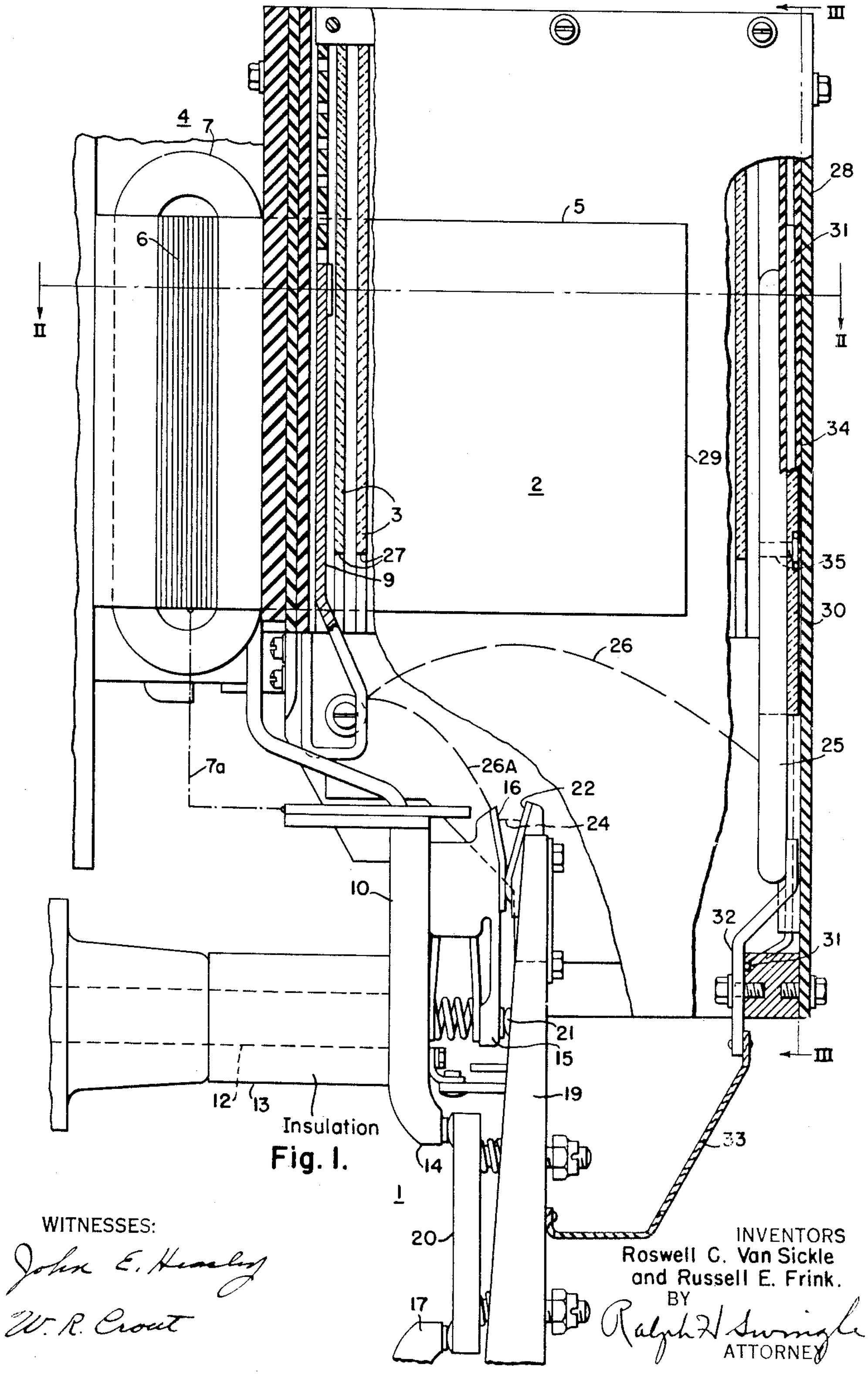
Figure 1 is a side-elevational view, partially in vertical section, of a circuit interrupter embodying our invention and shown in the closed circuit position.
Figure 2:
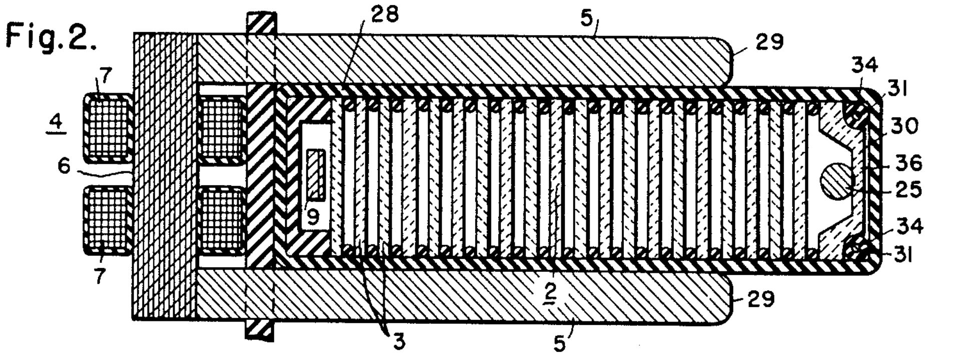
Fig. 2 is a plan view, in section, taken along the line II—II of Fig. 1, looking in the direction of the arrows.
Figure 3:
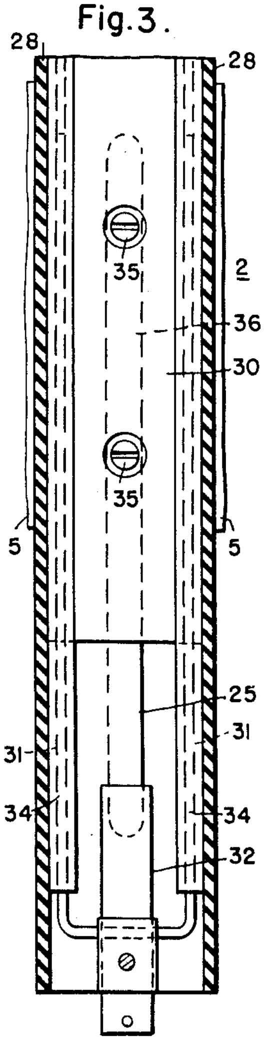
Fig. 3 is a vertical sectional view taken along the line III—III of Fig. 1.

Our invention describes means for providing increased impulse strength in magnetic circuit breakers, particularly magnetic air circuit breakers. It is more economical to build these breakers with a single blowout magnet structure per pole, as shown in Figs. 1–3 of the drawings. Referring to these figures, it will be noticed that the reference numeral 1 generally designates contact structure separable to establish an arc, which is moved upwardly into a chute structure 2 in which extinction of the arc occurs within a plurality of slotted ceramic plates 3.

A blowout magnet, generally designated by the reference numeral 4, is utilized to set up a transverse magnetic field across the arc chute 2 between a pair of pole plates 5 (Fig. 2). The pole plates 5 have an interconnecting yoke portion 6, which is encircled by a pair of blowout coils 7, electrically connected in parallel between the panel or inner arc horn 9 and the upper stationary main contact 10 of the device.

As shown more clearly in Fig. 1, a terminal stud 12 is shrouded by an insulating bushing 13, which passes through suitable supporting structure, not shown. The terminal stud 12 terminates within the upper stationary main contact 10, which comprises a stationary main bridging contact 14, a stationary secondary contact 15 and a stationary arcing contact 16.

The lower terminal stud for the circuit interrupter illustrated is not shown, but it supports a lower stationary bridging contact 17, and pivotally supports a movable contact arm 19. The movable contact arm 19 resiliently carries a movable bridging contact 20, a movable secondary contact 21 and a movable arcing contact 22.

In the closed-circuit position of the device, illustrated in Fig. 1, the movable bridging contact 20 electrically interconnects the stationary main contacts 14 and 17 to complete the circuit. During the opening operation, suitable mechanism, which forms no part of our invention, operates to pivotally rotate the movable contact arm 19 in a clockwise direction about its pivot point, not shown. This movement first separates the movable bridging contact 20 from the stationary bridging contacts 14, 17. Subsequently the movable and stationary secondary contacts 21, 15 part company; and finally the stationary and movable arcing contacts 16, 22 separate to establish an arc 24 therebetween. Although Fig. 1 illustrates the contact structure in the closed circuit position, the position of the initially drawn arc 24 is indicated for purposes of illustration.

Because of the loop electrical circuit involved, including the two parallel disposed terminal studs, the initially formed arc 24 moves upwardly into the arc chute structure 2 as a result of the magnetic forces involved. As well known by those skilled in the art, the magnetic forces encountered in a loop carrying current tend to expand the loop. Thus, the arc 24 contacts the panel end or inner arc horn 9 and also contacts the front or outer arcing horn 25, as indicated by the dot-dash line 26.

Thus, the two electrically-parallel blowout coils 7 are in parallel with the portion of the arc 26A, extending between the stationary arcing contact 16 and the panel end arcing horn 9. The current will tend to pass through the low resistance circuit involving the two parallel-disposed blowout coils 7, and this tendency will consequently cause extinction of the arc portion 26A of the arc 26.

This will energize the magnetic structure 4 so that a transverse magnetic field will pass between the pole plates 5, as well understood by those skilled in the art. This transverse magnetic field will act upon the arc 26, extending between the arcing horns 9, 25 to force the latter upwardly within the slotted plate or other arc extinguishing structure 3, to bring about extinction of the arc 26 at the upper ends of the slots 27, as more fully brought out in United States Patent 2,442,199, issued May 25, 1948, to Robert C. Dickinson and Russell E. Frink, and assigned to the assignee of the instant application.

The plate structure, including the plates 3, is disposed within a rectangularly-shaped insulating arc chute jacket or housing, designated by the reference numeral 28, and shown more clearly in Fig. 2 of the drawings. When a potential is applied between the arc horns 9, 25, the magnet 4 will assume a potential between that of the arc horns 9, 25 depending on the electrostatic coupling between the horns 9, 25 and the magnet 4. The arc horn 9 is connected to the blowout coils 7, and since the coils 7 are wound around the yoke 6 of the magnet 4, the coupling is much closer between this horn 9 and the magnet 4 than between the horn 25 and the magnet 4. This means that most of the voltage will appear between the magnet 4, that is, the front ends 29 of the pole plates 5, and the front arc horn 25. This is to be desired because of the difficulty in insulating the coils 7 from the magnet yoke 6. However, this condition produces a high voltage gradient between the arc horn 25 and the magnet 4. When surge voltage is impressed between the horns 9, 25, the air is broken down around the horn 25 in conventional interrupters, and this results in a progressive breakdown to the horn 9, or to the upper contact 10. The breakdown occurs at a fraction of the voltage that would be required to break down the gap if it were not for the electrostatic field distortion just described. We will now set forth a structure which will relieve some of the excessive gradient around the arc horn 25 without materially increasing the size of the interrupter, and at the same time making possible the higher impulse levels desired in this type of apparatus.

In the specification and in the claims the term "coupling" is meant to include the case where a solid electrical connection, indicated by the dot-dash line 7a in Fig. 1, is made between the magnet 4 and the stationary contact 10. This will, of course, bring the potential of the magnet 4 to the potential of the stationary contact. If desired, the solid connection could be made to the arc horn 9 instead of to the stationary contact 10.

Referring particularly to Figs. 2 and 3, it will be observed that we have provided a channel-shaped member 30 of insulating material, such as a suitable ceramic material, to protect the outer end of the arc chute jacket 28 from the heat of the arc. We also provide a pair of laterally disposed rods 31 (Fig. 2), electrically connected to the arc horn 25 at a point outside the region of high dielectric stress, and forming an electrostatic shield which reduces the gradient at the arc horn 25. We prefer to use conducting material, such as copper. However, even an insulating rod covered with a slightly conducting paint would suffice.

As shown more clearly in Fig. 3, the electrostatic rods 31 may be electrically attached to the lower section 32 of the outer arcing horn 25. As is customary in the art, this lower section 32 of the front arcing horn 25 is electrically connected by a flexible cable 33 to the movable contact arm 19.

Preferably, the electrostatic rods 31 are surrounded by tubes of insulating material 34 throughout the region of high dielectric stress. The tubes prevent the formation of corona around the surface of the rods and prevent discharge from these rods 31 to points of opposite polarity, namely, arc horn 9 or the stationary contact structure. As shown more clearly in Figs. 1 and 3, the front arcing horn 25 may be stationarily secured, by screws 35, to the midportion 36 of the channel-shaped ceramic member 30.

The presence of the shield rods 31 changes the form of the electric field and reduces the gradient of the field at the front arc horn 25. Consequently, the dielectric strength of the gap between the arc horns 9, 25 has been raised, and a higher voltage is required for breakdown. The shield rods 31 are surrounded by insulating material 34 of high dielectric strength and high specific inductive capacity, hereinafter abbreviated as s.i.c., which prevents electrical breakdown to these parts. In a similar manner, the corners of the magnet are protected by the walls of the arc chute jacket 28 of relatively high s.i.c. material.

Figure 11:
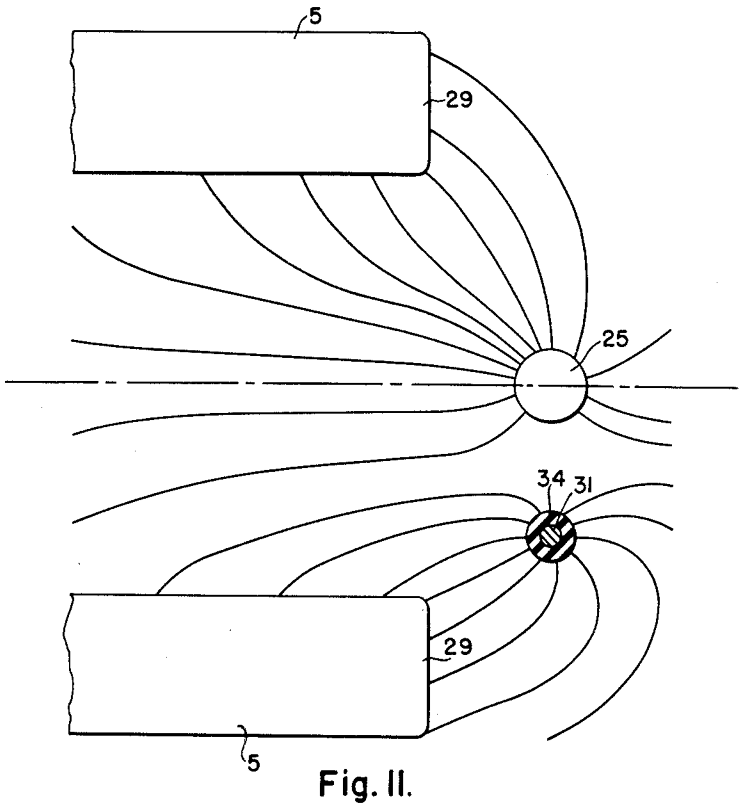
Fig. 11 is a composite diagrammatic view illustrating the electrostatic flux patterns before and after an application of our invention.

Referring to Fig. 11, the top half of the figure (above the dot-dash line) illustrates the high electrostatic stress conditions which exist near the arc horn 25 in a conventional style of interrupter, in which no electrostatic rods 31 are employed. The lower half of the figure (below the dot-dash line) shows the use of the rods 31, and indicates the relieved electrostatic stress conditions resulting from an employment of the rods 31 in laterally disposed relationship to the outer arcing horn 25.

These pictures are not intended to be an accurate plot and are used only for illustrating the principles involved. For example, the effects of structural materials of different dielectric constants, such as the arc chute jacket 28, have not been indicated.

When no shield is used, the horn 25 and the magnet poles 5 produce a field as shown at the top of Fig. 11, and all lines terminating on the magnet also terminate on the horn resulting in a high gradient close to the arc horn, as shown by the crowding together of the lines at the surface of the horn 25. When the shield rods 31 are included, as shown at the bottom of the figure, the rods 31 (at the same potential as the horn 25) change or distort the field as indicated.

In this case a large proportion of the lines which terminate on the magnet poles 5 are attracted to the shield rods 31, and fewer lines terminate on the arc horn 25. Consequently, there is less crowding of the lines around the arc horn 25 indicating a lower gradient in this region. The capacity between the horn 25 and shield rods 31 together with the magnet 5 is greater than if the shield rods 31 were omitted, and the gradient around the shield rods 31 is greater than around the horn 25 without the shield rods 31. However, breakdown to the shield rods 31 is prevented by the insulating tubes 34 around them, and the comparatively lower gradient around the horn 25 for a given potential permits a high potential to appear between the horn 25 and the magnet poles 5 before the air adjacent to the horn 25 is broken down. As pointed out above, it is the initial breakdown of the air around the horn 25 which initiates the overall breakdown of the gap in the arc chute.

Figure 12:
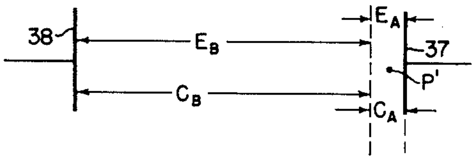
Figs. 12 and 13 are diagrammatic views illustrating the principles of our invention.

Referring to Fig. 12, let us assume that we have a capacitor with air as the dielectric medium between the plates 37, 38. Assume that the capacitor is charged to a potential of 100 volts across the plates 37, 38 and that they are spaced 10 centimeters apart. Thus, a potential gradient will exist between the plates 37, 38, equal to 100 volts divided by 10 centimeters, or 10 volts per centimeter potential gradient within the air space, say at the point P'.

Figure 13:
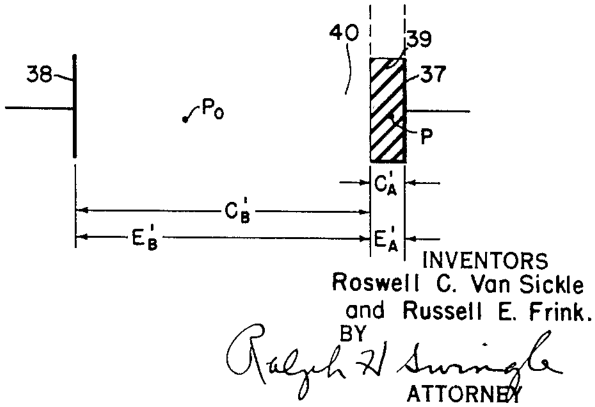

Consider, in Fig. 13, a similar capacitor of the same dimensions, but one-tenth of the dielectric medium between the plates 37, 38 being taken up by an insulating material 39, having a dielectric constant five times that of the air previously used in Fig. 12 as the dielectric medium.

Assume that the same voltage is impressed between the plates 37 and 38, namely, 100 volts. It is well known that if the dielectric constant of a medium is K, then the potential gradient at the point P will be the flux density at that point divided by K. Thus, the voltage gradient within the dielectric material 39 will be about one-fifth the value previously determined at this point, P' in the Fig. 12 capacitor, where air was used, but on the other hand, the voltage gradient within the remaining space 40 of the capacitor of Fig. 13 will be slightly increased, as set out hereinafter.

Let the capacitance of the air capacitor of Fig. 12 be C. It may be considered as two air condensers in series, one having a capacitance of $C_A$ and the other with a length one-tenth that of the entire condenser having a capacitance of $C_B$. Then obviously $C_A=10C$ and $$C_B=\frac{10}{9}C$$

There are also in effect in Fig. 13 two condensers in series. The one formed by the insulation has a capacitance $C'_A=50C$ and the other one has the same capacitance as before, namely $$C_B=\frac{10}{9}C$$

The total capacitance C' of the combination of Fig. 13 may be computed as follows:

$$\frac{1}{C'}=\frac{1}{C'_A}+\frac{1}{C_B}=\frac{1}{50C}+\frac{1}{\frac{10}{9}C}=\frac{0.92}{C}$$

or $$C'=\frac{C}{0.92}=1.08C$$

Because of the increased capacitance an increased amount of electrostatic flux will pass between the plates 37, 38 of Fig. 13 as compared to that in Fig. 12.

What is the increased potential gradient at the point $P_0$ in the region 40?

$$E'_A+E'_B=100 \text{ volts}$$

It is well known that for series condensers $$\frac{E'_B}{E'_A}=\frac{C'_A}{C_B}$$

$$E'_B=\frac{C'_A}{C_B}E'_A=\frac{C'_A}{C_B}(100-E'_B)$$

or $$E'_BC_B=100\ C'_A-C'_AE'_B$$

$$E'_B(C_B+C'_A)=100\ C'_A$$

$$E'_B=\frac{100C'_A}{C_B+C'_A}$$

but $$C'_A=50C \text{ and } C_B=\frac{10}{9}C$$

$$\therefore E'_B=\frac{100\times 50C}{\frac{10}{9}C+50C}=97.8 \text{ volts}$$

and $$E'_A=100 \text{ volts}-97.8 \text{ volts}=2.2 \text{ volts.}$$

The potential gradient at any point $P_0$ within the air space of the condenser of Fig. 13=

$$\frac{97.8}{9 \text{ cm.}} \text{ volts}=10.8 \text{ volts/cm.}$$

a slight increase of the potential gradient as compared to the 10 volts/cm. in the air space of the condenser of Fig. 12. The potential gradient at the point P within the insulating slab is $$\frac{2.2}{1 \text{ cm.}} \text{ volts}=2.2 \text{ volts/cm.}$$

as compared with 10 volts/cm. in the condenser of Fig. 12, a considerable reduction in electrostatic stress. This shows that in a uniform air gap the introduction of a thin layer of high s.i.c. material reduces the stress where the insulation is used almost inversely to the s.i.c. of the material and increases the stress in the air by a relatively small amount. In our circuit breaker, the field is not uniform and the introduction of high s.i.c. material at the point of greatest flux concentration or dielectric stress reduces the gradient there by a large amount, while raising it only slightly in the regions of lesser stress. The result is a reduction in the ratio of the maximum stress to the average stress. This enables the gap to withstand more voltage before ionization and breakdown occurs.

Analogizing the situation set out in Figs. 12 and 13 to the situation presented in Fig. 11, it will be observed that by utilizing the rods 31 with the insulating tubes 34 thereabout, that the flux density immediately adjacent to the rods 31 is increased slightly by the insulating tubes 34 but the increased flux is carried by the high s.i.c. material of the tubes 34 at a lower stress or gradient. The insulation gives a relatively larger electrode surface at the end of the air path and keeps the gradient there below the value producing corona.

A sample was built as described in Figs. 1–3 and tested with surge voltages. Test results showed a minimum breakdown of 108 kv. When the shield rods 31 were removed this lowered the minimum breakdown to 92.6 kv. Extensive experimenting and testing, using the expedients generally resorted to for increasing impulse strength, such as rounding up the corners, increasing spacing of parts within reasonable limits, placing foil in the arc chute jacket, etc., had failed to give as much improvement.

Figure 5:
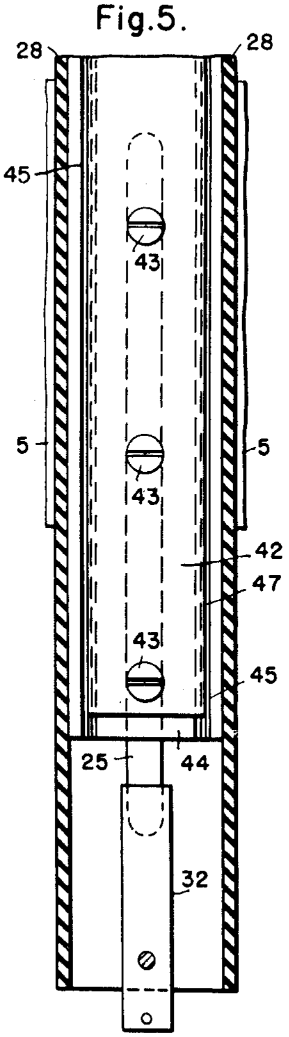
Fig. 5 is a vertical sectional view taken along the line V—V of Fig. 4.
Figure 4:
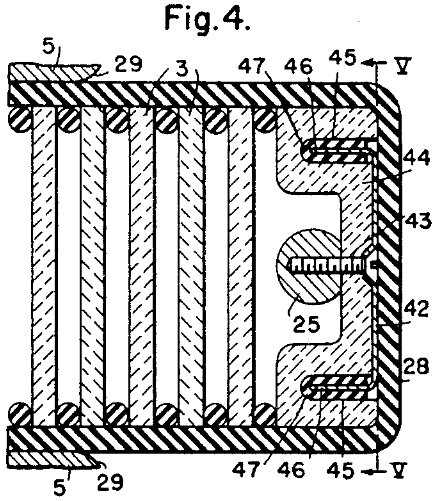
Fig. 4 is an enlarged fragmentary plan view, in section, taken through a modified type of circuit interrupter embodying our invention.

Referring to Figs. 4 and 5 of the drawings, it will be observed that we have provided a modified construction in which the electrostatic shield rods 31 are replaced by a U-shaped conducting channel member 42, electrically connected by screws 43 to the outer arc horn 25 of the device. Again a channel-shaped member of insulating material 44, preferably of a ceramic material, is employed having slots 45 formed therein, into which the channel member 42 may be inserted. Preferably, the legs 46 of the conducting channel member 42 are embedded in slotted insulating strips 47 of relatively high s.i.c. material. Breakdown from the legs 46 through the porous ceramic material 44 is prevented by the insulating strips 47.

Figure 6:
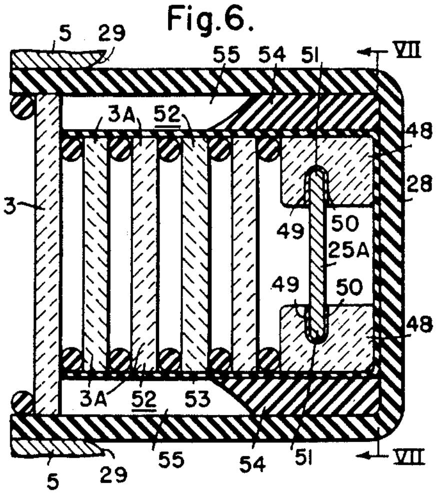
Fig. 6 is an enlarged fragmentary plan view, in section, taken through a still further modified type of device illustrating our invention.
Figure 7:
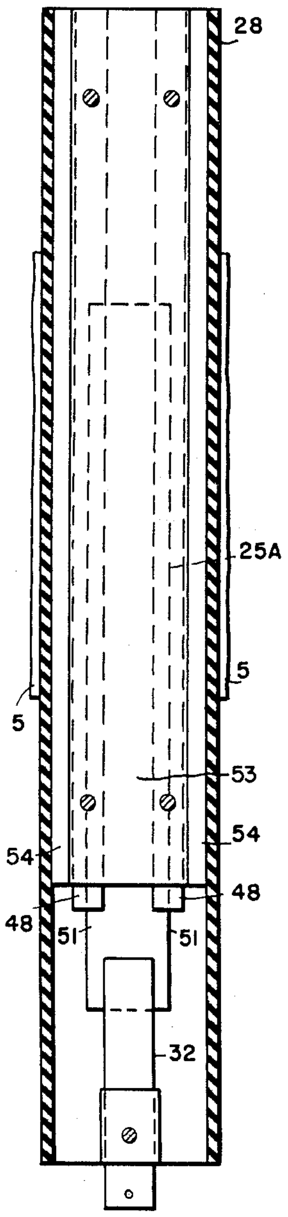
Fig. 7 is a vertical sectional view taken through the modified structure of Fig. 6, along the line VII—VII thereof.

Figs. 6 and 7 illustrate a further embodiment of our invention which utilizes the same principle, although it is slightly different in construction. The outer arc horn 25A assumes the form of a conducting strip or blade, which is embedded in insulating supports 48, preferably of ceramic material. The insulation extends around the lateral edge portions 51 of the blade-shaped outer arcing horn 25A toward the internal axis, or central portion, of the arc chute 2 on the face of the blade 25A nearest the arcing region. The supports 48 have grooves 49 provided therein, which are rendered conducting by being painted with conducting paint or spraying with metal, as indicated by the reference numeral 50. The electrostatic flux lines between the magnet 5 and the horn 25A will concentrate on the lateral edges 51 of the horn 25A, which are embedded in the ceramic. The flux lines in air which terminate on the arc horn 25A are thus reduced by this construction. Therefore, a higher voltage can be impressed across the interrupter before the air adjacent to the horn 25A becomes ionized and acts as a trigger to cause a discharge. Conditions are further improved by making the part of the stack of ceramic plates 3 adjacent to the arc horn 25A narrower than the balance of the stack, as indicated at 52, and surrounding the narrow plates 3A with a fish paper channel 53. This prevents a development of ionization on the inside surface of the arc chute jacket 28 adjacent to the magnet 5 to the space around the arc horn 25A. The insulating filler strips 54 act to reduce the ionization in the space 55 by producing more uniform distribution of the field in this space 55. A sample as per this figure and of dimensions similar to those of the sample of Fig. 2, gave a minimum breakdown value of 111.9 kilovolts.

Figure 9:
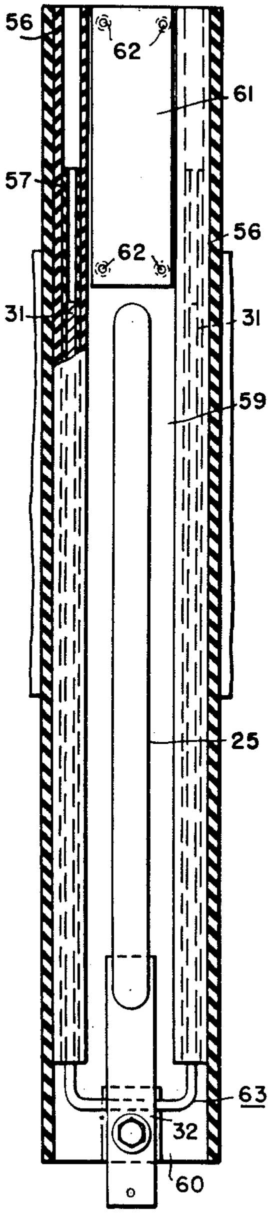
Fig. 9 is a vertical sectional view taken substantially along the line IX—IX of the modification shown in Fig. 8 of the drawings.
Figure 8:
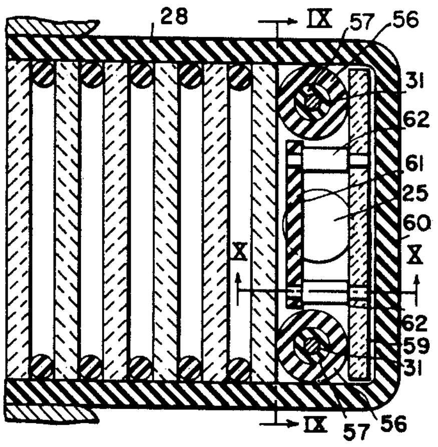
Fig. 8 is an enlarged fragmentary plan view, in section, taken through another embodiment of our invention.
Figure 10:
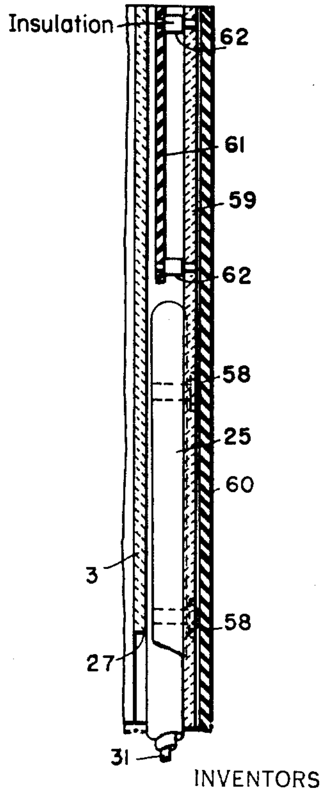
Fig. 10 is a fragmentary vertical sectional view taken along the line X—X of Fig. 8.

Referring to Figs. 8–10, it will be observed that we have provided a modified type of construction utilizing an outer arc horn 25 and a pair of laterally disposed electrostatic rods 31. Each of the rods 31 has an outer tube of insulating material 56, preferably of fiber of a relatively high s.i.c. material, and an inner insulating tube 57 also of a material of relatively high s.i.c. material. The fiber protects the inner tube 57 from the heat of the arc. The arc horn 25 is fixedly secured by screws 58 to an insulating plate 59 preferably of a ceramic material, which is disposed immediately inside the end wall 60 of the arc chute jacket 28. A splitter plate 61 is disposed adjacent the upper end of the arc horn 25. It is secured by a plurality of insulating pins 62 to the end insulating plate 59. The electrostatic rods 31, in this instance are constituted by a U-shaped rod member, generally designated by the reference character 63 in Fig. 9. As in the construction set forth in Figs. 1–3, the lower end of the U-shaped rod 63 is electrically connected to the lower portion 32 of the arcing horn 25, as illustrated in Fig. 9 of the drawings.

Figure 14:
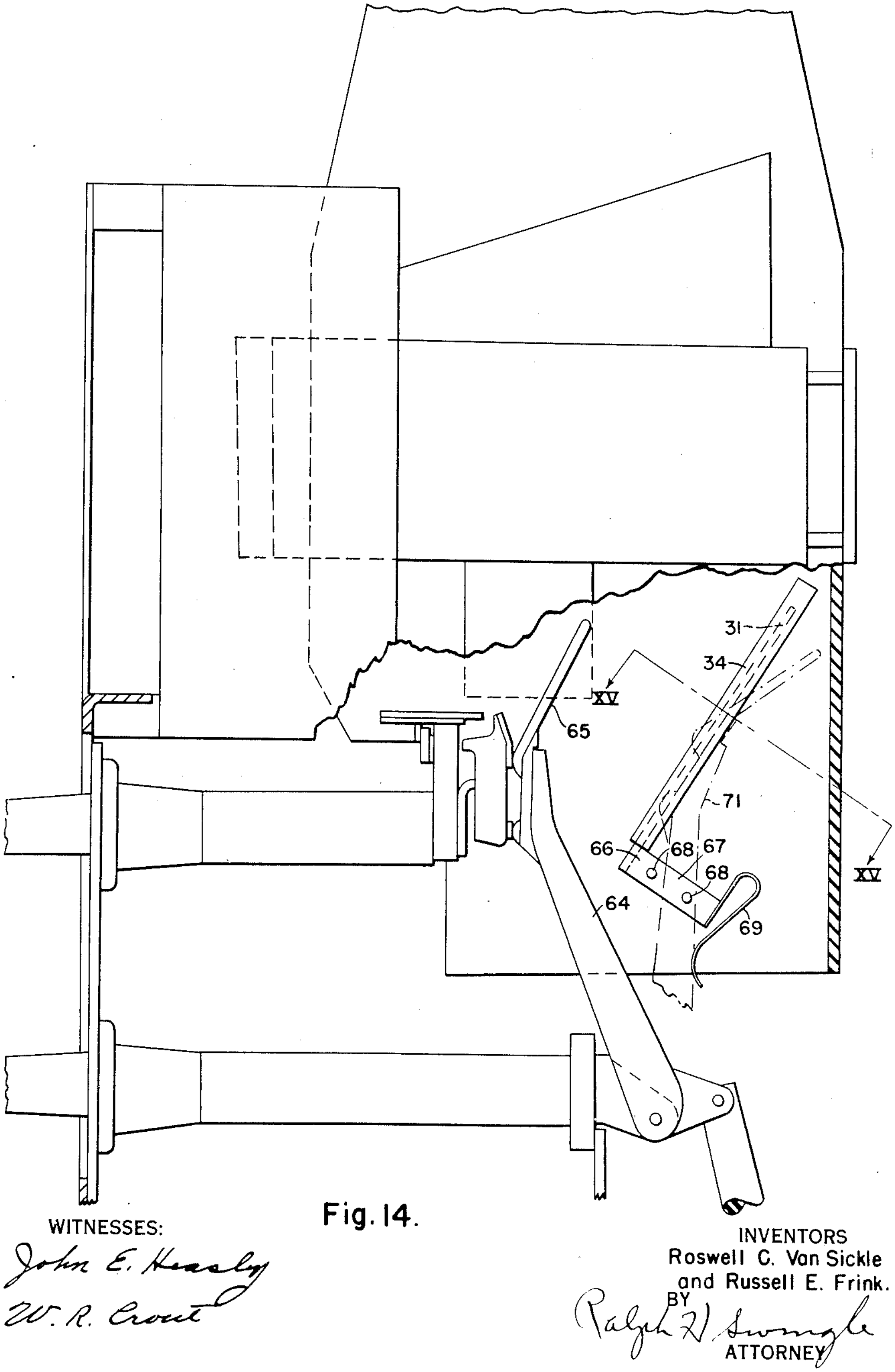
Fig. 14 is a side-elevational view, partially in section, of a modified type circuit interrupter, the contact structure being shown in the closed circuit position.

Fig. 14 illustrates an application of our invention to a circuit interrupter employing a movable contact arm 64 having a movable arc horn 65 secured to and movable therewith. Near the end of the opening stroke the movable contact arm 64 moves between a pair of static rods 31, more clearly shown in Fig. 15 of the drawings. The static rods 31 are shrouded by insulating tubes 34 and are electrically connected together by a U-shaped conducting member 66. The legs 67 of the U-shaped conducting member 66 are stationarily secured to the side walls of the arc chute jacket 28 by bolts 68.

A flexible contact clip 69 is secured by rivets 70 to the bight portion of the conducting member 66. As more clearly observed in Fig. 14, when the movable contact arm 64 nearly reaches its open circuit position, it strikes the contact clip 69 and thereby electrically connects the static rods 31 to the contact arm 64 and hence to the movable arc horn 65. The dotted line position 71 of Fig. 14 illustrates the relative position of the several parts in the fully open circuit position of the interrupter.

Figure 15:
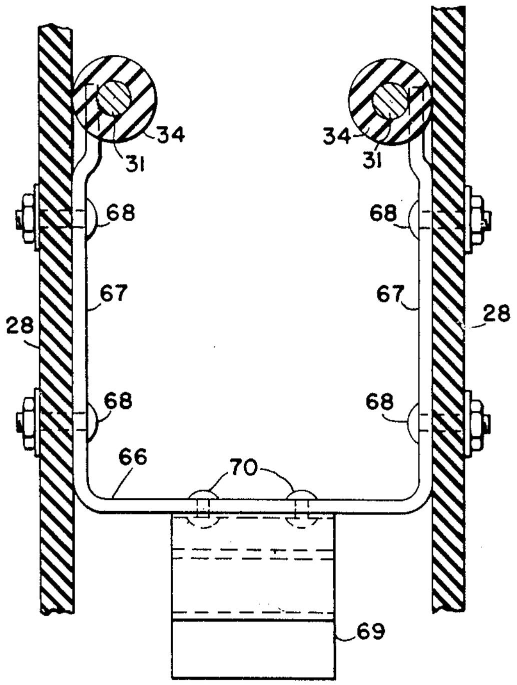
Fig. 15 is an enlarged fragmentary sectional view taken along the line XV—XV of Fig. 14.

Figs. 14 and 15, therefore, show an application of our invention to an interrupter in which an outer stationary arc horn 25, of the type previously discussed, is not used, and where reliance may be placed upon the stationarily mounted static rods 31.

Figure 16:
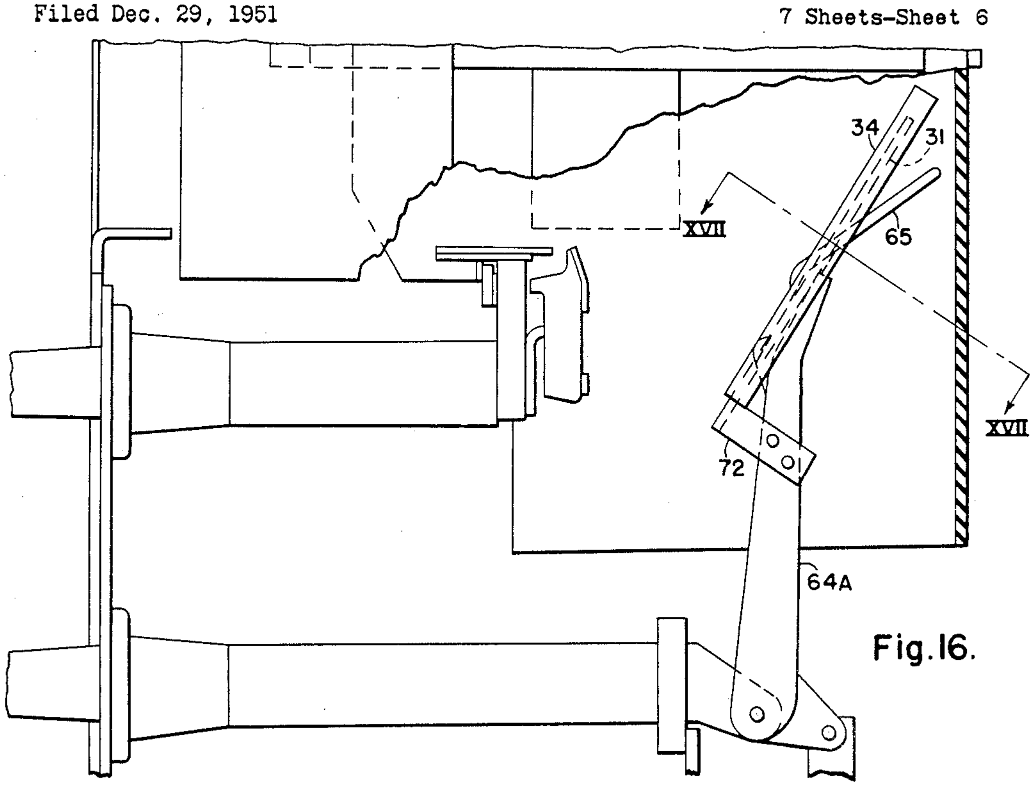
Fig. 16 is a side-elevational view, partially in section, of a still further modified type of circuit interrupter embodying our invention, the contact structure being shown in the fully open circuit position.
Figure 17:
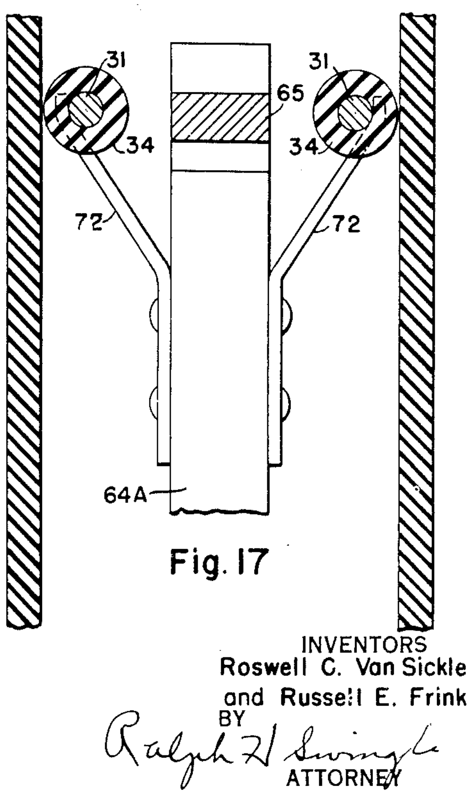
Fig. 17 is an enlarged fragmentary sectional view taken along the line XVII—XVII of Fig. 16.

Figs. 16 and 17 show a still further modification of our invention in which the static rods 31, shrouded by the insulating tubes 34, are rigidly secured by conducting plates 72 to the movable contact arm 64A. As more clearly shown in Fig. 16, the static rods 31 move with the contact arm 64A so as always to make the desired relationship with the movable arc horn 65 of the movable contact arm 64A.

From the foregoing description of Figs. 14–17, it will be apparent that our invention may be applied to an interrupter utilizing a movable arc horn, in which the static rods 31 are either movable with the contact arm, or are stationarily mounted and make contact with the contact arm near the end of the opening operation.

Figure 18:
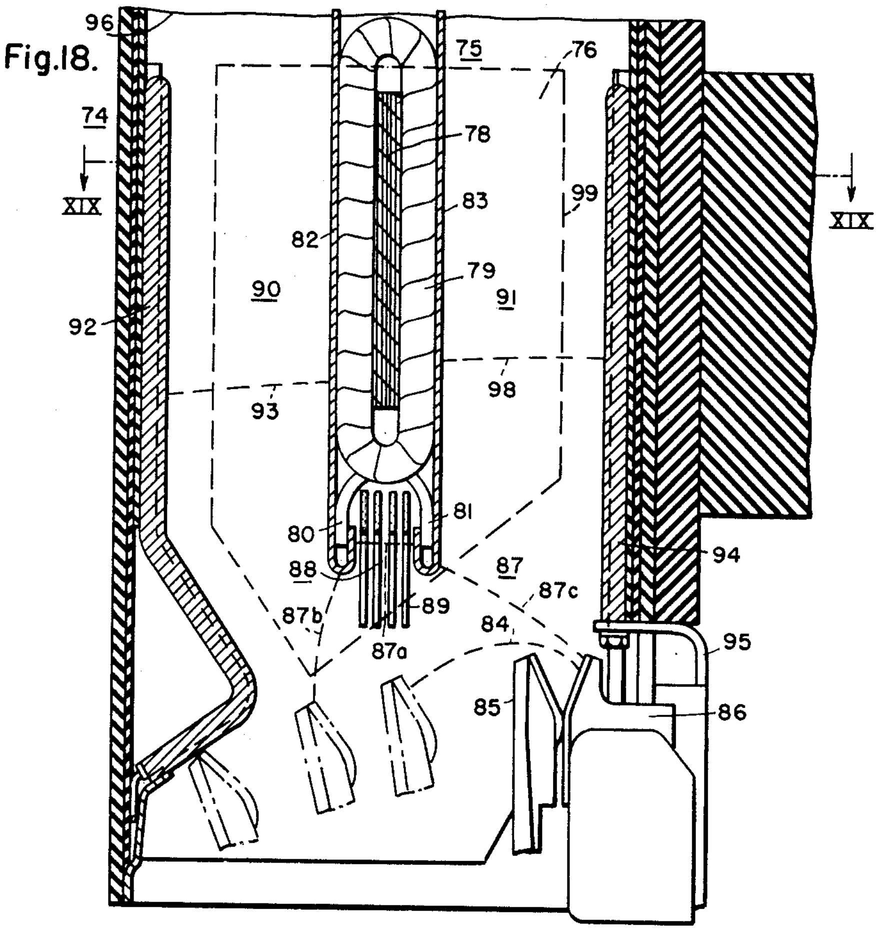
Fig. 18 is a vertical sectional view through a modified type of circuit interrupter utilizing an H-type of blowout magnet, which incorporates certain features of our invention, the contact structure being shown in the closed circuit position.
Figure 19:
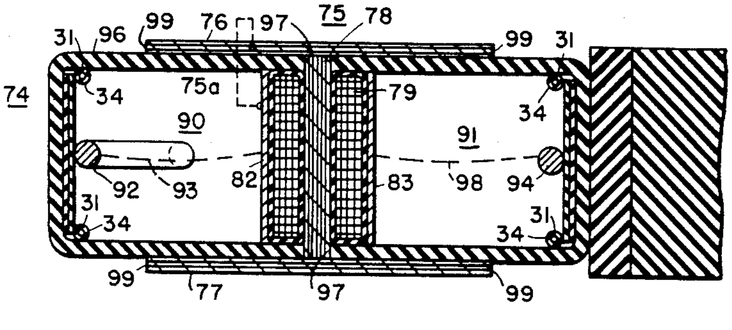
Fig. 19 is a sectional view through the circuit interrupter of Fig. 18 taken along the line XIX—XIX thereof.

Figs. 18 and 19 collectively illustrate an application of our invention to a modified type of circuit interrupter, generally designated by the reference numeral 74 and utilizing an H-type of blowout magnet 75. As more clearly shown in Fig. 19, the H-type of blowout magnet 75 includes a pair of pole plates 76, 77 interconnected by a core 78, the latter being encircled by an energizing blowout coil 79.

As more clearly viewed in Fig. 18, the terminal leads 80, 81 of the blowout coil 79 are preferably connected to inner floating arc horns 82, 83. The blowout magnet 75 is at a floating potential in the fully open circuit position of the interrupter. During the opening operation, the arc 84, which is drawn between the movable arcing contact 85 and the stationary contact 86, is looped upwardly into engagement with the lower ends of the inner arc horns 80, 81, as indicated by the dotted line 87. The arc portion **87*a* is interrupted by a transfer stack 88, consisting of a plurality of spaced slotted ceramic plates 89**.

Following the extinction of the arc portion **87*a*, the blowout coil 79 is energized and serves to set up a transverse magnetic field between the pole plates 76, 77 across the two arc chute sections, generally designated by the reference characters 90, 91. The arc portion 87*b* moves upwardly within the arc chute section 90, the lower end thereof transferring to an outer arc horn 92, which is electrically connected to the movable contact arm in a manner previously described in connection with Fig. 1 of the drawings. Thus, the arc portion 87*b* moves upwardly to the position 93, indicated in Fig. 18, extending between the arc horns 82, 92, and is extinguished within the arc chute section 90. If desired, suitable slotted spaced ceramic plates, not shown, may be employed within the arc chute section 90 to facilitate extinction of the arm 93**. For purposes of clarity, such plates have been omitted in order to more clearly show the magnet structure.

Similarly, the arc portion **87*c* moves upwardly within the arc chute section 91, the lower end thereof transferring from the stationary contact 86 to an outer arc horn 94, which is electrically connected to the stationary contact 86 by a conductor 95**, as shown in Fig. 18.

An insulating arc chute jacket 96 encloses both arc chute sections 90, 91 and has two rectangular slots 97 removed therefrom on opposite sides thereof, to accommodate the core 78. The arc section **87*c* moves upwardly within the arc chute section 91 to a position 98** in Fig. 18, where it is extinguished therein by suitable plate structure or other suitable arc-extinguishing means.

Because of the coupling between the arc horns 82, 83 and the blowout magnet 75 (and this might include the solid connector indicated by the dot-dash line **75*a* therebetween), the same problem exists in a circuit interrupter of the type shown in Figs. 18 and 19, as existed in the foregoing structures; namely, that the space between the ends 99 and the arc horns 94, 92 must withstand most of the voltage. It is desirable, therefore, to utilize the electrostatic rods 31 in the manner indicated in Fig. 19, the rods 31 being surrounded by insulating tubes 34. These electrostatic rods 31 are connected to their respective arc horns 92, 94 and serve to reduce the voltage gradient immediately adjacent to the arc horns 92, 94 following circuit interruption. The principle of operation and the functioning of the rods 31** is the same as described theretofore in connection with the other interrupters disclosed in the drawings. Figs. 18 and 19 merely indicate the application of such electrostatic rods to a circuit interrupter of the type utilizing an H-type floating blowout magnet.

Certain features of the structure set out in Figs. 18 and 19 and the operation and principle of arc extinction are more fully set out and claimed in U. S. patent application filed May 26, 1951, Serial No. 228,446 now U. S.

Patent 2,692,319, issued October 19,1954, by Robert C. Dickinson and Russell E. Frink, now Patent No. 2,692,319, issued October 19, 1954, and assigned to the assignee of the instant application.

In the construction, according to Figs. 18 and 19, instead of employing a pair of static rods 31 with each arc horn 92, 94, instead, any of the other arrangements shown heretofore in Figs. 1–10 may be employed, as will be obvious. Also, it is conceivable that instead of using a stationary arc horn 92 associated with the movable arcing contact 85, such stationary arc horn 92 might be eliminated, and instead a movable arc horn could be associated with the movable arcing contact 85, as was the case in Figs. 16 and 17. Also, a construction as shown in Fig. 14 could be utilized in place of the stationary arc horn 92 of Fig. 18, as would be obvious to one skilled in the art.

The foregoing description has considered two sets of static rods 31, one set associated with each arc horn 92, 94. The outer set of rods 31 associated with arc horn 92 is the more important. To get the maximum benefit of the invention, however, although making the construction slightly more expensive, two sets of static rods 31 are preferred, as shown in Figs. 18 and 19.

From the foregoing description it will be apparent that we have provided simple and economical means for relieving the high voltage gradient existing adjacent the arc horn of a circuit interrupter of the type employing a blowout magnet. It will be observed that the incorporation of our improved device does not necessitate an increase in the dimensions of the interrupted, and its inclusion is easily brought about.

Although we have shown and described specific structures, it is to be clearly understood that the same were merely for the purpose of illustration, and that changes and modifications may readily be made therein by those skilled in the art without departing from the spirit and scope of the appended claims.

We claim as our invention:

1. A circuit interrupter including a blowout magnet and an arc chute disposed between the legs thereof, a pair of conducting members between which high voltage exists in the open circuit position of the interrupter, one conducting member having at least one laterally extending structural portion at the same potential as the member at least in the open circuit position embedded in insulation in the region of voltage stress, said insulation having a greater s. i. c. than air to relieve the electrostatic stress conditions existing between the ends of the legs of the blowout magnet and said one conducting member, the laterally extending structural portion being insulated from the magnet and also from the other conducting member, and said laterally extending structural member not substantially increasing the capacity coupling between said one conducting member and the magnet.

2. A circuit interrupter including a blowout magnet and an arc chute disposed between the legs thereof, a pair of conducting members between which high voltage exists in the open circuit position of the interrupter, at least one static rod disposed laterally of one conducting member at least in the open circuit position, and at the same potential as said one conducting member at least in the open circuit position, said static rod being embedded in insulation having a greater s. i. c. than air in the region of voltage stress, and said static rod not substantially increasing the capacity coupling between the magnet and said one conducting member.

3. A circuit interrupter including a blowout magnet and an arc chute disposed between the legs thereof, a pair of conducting members between which high voltage exists in the open circuit position of the interrupter, the coupling between the blowout magnet and one of the conducting members being so great that considerable potential exists between the outer ends of the legs of the blowout magnet and the other conducting member in the open circuit position of the interrupter, a pair of static rods disposed laterally of said other conducting member at least in the open circuit position, and at the same potential as said other conducting member at least in the open circuit position.

4. A circuit interrupter including a blowout magnet and an arc chute disposed between the legs thereof, a pair of conducting members between which high voltage exists in the open circuit position of the interrupter, the coupling between the blowout magnet and one of the conducting members being so great that considerable potential exists between the outer ends of the legs of the blowout magnet and the other conducting member in the open circuit position of the interrupter, a pair of static rods disposed laterally of said other conducting member at least in the open circuit position, and at the same potential as said other conducting member at least in the open circuit position, and said static rods being embedded in insulation in the region of voltage stress having a greater s. i. c. than air.

5. A circuit interrupter including a blowout magnet and an arc chute disposed between the legs thereof, a pair of conducting members between which high voltage exists in the open circuit position of the interrupter, the coupling between the blowout magnet and one of the conducting members being so great that considerable potential exists between the outer ends of the legs of the blowout magnet and the other conducting member in the open circuit position of the interrupter, a channel-shaped conducting member at the same potential as said other conducting member at least in the open circuit position and insulated from said one conducting member, and the edge portions of the channel-shaped member being completely embedded in solid insulation in the region of voltage stress.

6. A circuit interrupter including a blowout magnet and an arc chute disposed between the legs thereof, said arc chute enclosing the arcing region and having an internal axis, a pair of spaced conducting members associated with the arc chute between which high voltage exists in the open circuit position of the interrupter, the coupling between the blowout magnet and one of the conducting members being so great that a potential difference exists between the outer ends of the legs of the blowout magnet and the other conducting member in the open circuit position of the interrupter, said other conducting member being blade-shaped with the lateral edge portions thereof completely embedded in solid insulation with the insulation extending around the lateral edge portions toward the internal axis of the arc chute on the face of said blade-shaped conducting member nearest the arcing region at least in the region of electrostatic stress.

7. A circuit interrupter including a substantially rectangularly-shaped arc chute having a pair of conducting members associated therewith, a blowout magnet surrounding one end of the arc chute and having the legs thereof extending along the side walls of the arc chute, high voltage existing between the conducting members in the open circuit position of the interrupter, the coupling between the blowout magnet and one of the conducting members being so great that a potential difference exists between the outer ends of the legs of the blowout magnet and the other conducting member in the open circuit position of the interrupter, said other conducting member having at least one laterally extending portion at the same potential as the member at least in the open circuit position embedded in insulation in the region of voltage stress, said insulation having a greater s. i. c. than air to relieve the electrostatic stress conditions existing between the ends of the legs of the blowout magnet and said other conducting member, said laterally extending structural portion being insulated from the magnet and also from said one conducting member, and said laterally extending structural member not substantially increasing the capacity coupling between said other conducting member and the magnet.

8. A circuit interrupter including a substantially rectangularly-shaped arc chute having a pair of conducting members associated therewith, a blowout magnet surrounding one end of the arc chute and having the legs thereof extending along the side walls of the arc chute, high voltage existing between the conducting members in the open circuit position of the interrupter, the coupling between the blowout magnet and one of the conducting members being so great that potential exists between the outer ends of the legs of the blowout magnet and the other conducting member in the open circuit position of the interrupter, at least one static rod disposed laterally of said other conducting member at least in the open circuit position, and at the same potential as said other conducting member at least in the open circuit position, and said static rod being embedded in insulation in the region of voltage stress having a greater s. i. c. than air, said static rod being insulated from the magnet and also from said one conducting member, and said static rod not substantially increasing the capacity coupling between said other conducting member and the magnet.

9. A circuit interrupter including a substantially rectangularly-shaped arc chute having a pair of conducting members associated therewith, a blowout magnet surrounding one end of the arc chute and having the legs thereof extending along the side walls of the arc chute, high voltage existing between the conducting members in the open circuit position of the interrupter, a pair of static rods disposed laterally of one conducting member at least in the open circuit position, and at the same potential as said one conducting member at least in the open circuit position.

10. A circuit interrupter including a substantially rectangularly-shaped arc chute having a pair of conducting members associated therewith, a blowout magnet surrounding one end of the arc chute and having the legs thereof extending along the side walls of the arc chute, high voltage existing between the conducting members in the open circuit position of the interrupter, a pair of static rods disposed laterally of one conducting member at least in the open circuit position, and at the same potential as said one conducting member at least in the open circuit position, and said static rods being embedded in insulation in the region of voltage stress having a greater s. i. c. than air.

11. A circuit interrupter including a substantially rectangularly-shaped arc chute having a pair of conducting members associated therewith, a blowout magnet surrounding one end of the arc chute and having the legs thereof extending along the side walls of the arc chute, high voltage existing between the conducting members in the open circuit position of the interrupter, the coupling between the blowout magnet and one of the conducting members being so great that considerable potential exists between the outer ends of the legs of the blowout magnet and the other conducting member in the open circuit position of the interrupter, a channel-shaped conducting member at the same potential as said other conducting member at least in the open circuit position and insulated from said one conducting member, and the edge portions of the channel-shaped member being completely embedded in solid insulation in the region of voltage stress.

12. A circuit interrupter including a substantially rectangularly-shaped arc chute having a pair of spaced conducting members associated therewith, said arc chute enclosing the arcing region and having an internal axis, a blowout magnet surrounding one end of the arc chute and having the legs thereof extending along the side walls of the arc chute, high voltage existing between the conducting members in the open circuit position of the interrupter, the coupling between the blowout magnet and one of the conducting members being so great that considerable potential exists between the outer ends of the legs of the blowout magnet and the other conducting member in the open circuit position of the interrupter, said other conducting member being blade-shaped with the lateral edge portions thereof completely embedded in solid insulation with the insulation extending around the lateral edge portions toward the internal axis of the arc chute on the face of said blade-shaped conducting member nearest the arcing region at least in the region of electrostatic stress.

13. Circuit interrupting means including a substantially rectangularly-shaped arc chute having a pair of spaced inner and outer arcing horns disposed therewithin, a blowout magnet surrounding one end of the arc chute and having the legs thereof extending along opposite side walls of the arc chute, a blowout coil for energizing the blowout magnet and electrically connected to the inner arc horn, the coupling between the blowout magnet and the inner arc horn being so great that a potential difference exists between the outer ends of the legs of the blowout magnet and the outer arc horn in the open circuit position of the interrupter, the outer arc horn having at least one laterally extending portion at the same potential as the outer arc horn embedded in insulation in the region of voltage stress, said insulation having a greater s. i. c. than air to relieve the electrostatic stress conditions existing between the ends of the legs of the blowout magnet and the outer arcing horn, said laterally extending portion being insulated from the magnet and also from the inner arc horn, and said laterally extending portion not substantially increasing the capacity coupling between the outer arc horn and the magnet.

14. Circuit interrupting means including a substantially rectangularly-shaped arc chute having a pair of spaced inner and outer arcing horns disposed therewithin, a blowout magnet surrounding one end of the arc chute and having the legs thereof extending along opposite side walls of the arc chute, a blowout coil for energizing the blowout magnet and electrically connected to the inner arc horn, the coupling between the blowout magnet and the inner arc horn being so great that potential exists between the outer ends of the legs of the blowout magnet and the outer arc horn in the open circuit position of the interrupter, and at least one static rod disposed laterally of the outer arcing horn and at the same potential as the outer arcing horn to relieve the electrostatic stress conditions, and said static rod being embedded in insulation in the region of voltage stress having a greater s. i. c. than air, said static rod being insulated from the magnet and also from the inner arc horn, and said static rod not substantially increasing the capacity coupling between the magnet and the outer arcing horn.

15. Circuit interrupting means including a substantially rectangularly-shaped arc chute having a pair of spaced inner and outer arcing horns disposed therewithin, a blowout magnet surrounding one end of the arc chute and having the legs thereof extending along opposite side walls of the arc chute, a blowout coil for energizing the blowout magnet and electrically connected to the inner arc horn, the coupling between the blowout magnet and the inner arc horn being so great that potential exists between the outer ends of the legs of the blowout magnet and the outer arc horn in the open circuit position of the interrupter, a channel-shaped member at the same potential as the outer arcing horn with the edge portions thereof completely embedded in solid insulation in the region of voltage stress, and said channel-shaped member being insulated from the magnet and also from the inner arc horn.

16. Circuit interrupting means including a substantially rectangularly-shaped arc chute enclosing the arcing region and having a pair of spaced inner and outer arcing horns disposed therewithin, said rectangularly-shaped arc chute having an internal axis, a blow out magnet surrounding one end of the arc chute and having the legs thereof extending along opposite side walls of the arc chute, a blowout coil for energizing the blowout magnet and electrically connected to the inner arc horn, the coupling between the blowout magnet and the inner arc horn being so great that considerable potential exists between the outer ends of the legs of the blowout magnet and the outer arc horn in the open circuit position of the interrupter, and the outer arcing horn being blade-shaped with the lateral edge portions thereof completely embedded in solid insulation with the insulation extending around the lateral edge portions toward the internal axis of the arc chute on the face of said blade-shaped outer arcing horn nearest the arcing region at least in the region of electrostatic stress.

17. Circuit interrupting means including a substantially rectangularly-shaped arc chute having a pair of spaced inner and outer arcing horns disposed therewithin, a U-shaped blowout magnet surrounding one end of the arc chute and having the legs thereof extending along opposite side walls of the arc chute, a blowout coil for energizing the blowout magnet and electrically connected to the inner arc horn, the coupling between the U-shaped blowout magnet and the inner arc horn being so great that considerable potential exists between the outer ends of the legs of the U-shaped blowout magnet and the outer arc horn in the open circuit position of the interrupter, the outer arc horn having at least one laterally extending portion at the same potential as the outer arc horn embedded in insulation in the region of voltage stress, said insulation having a greater s. i. c. than air to relieve the electrostatic stress conditions existing between the ends of the legs of the blowout magnet and the outer arcing horn, the laterally extending portion being insulated from the magnet and also from the inner arcing horn, and said laterally extending portion not substantially increasing the capacity coupling between the magnet and the outer arc horn.

18. Circuit interrupting means including a substantially rectangularly-shaped arc chute having a pair of spaced inner and outer arcing horns disposed therewithin, a U-shaped blowout magnet surrounding one end of the arc chute and having the legs thereof extending along opposite side walls of the arc chute, a blowout coil for energizing the blowout magnet and electrically connected to the inner arc horn, the coupling between the U-shaped blowout magnet and the inner arc horn being so great that considerable potential exists between the outer ends of the legs of the U-shaped blowout magnet and the outer arc horn in the open circuit position of the interrupter, and at least one static rod disposed laterally of the outer arcing horn and at the same potential as the outer arcing horn to relieve the electrostatic stress conditions, and said static rod being embedded in insulation in the region of voltage stress having a greater s. i. c. than air, said static rod being insulated from the magnet and also from the inner arcing horn, and said static rod not substantially increasing the capacity coupling between the magnet and the outer arcing horn.

19. Circuit interrupting means including a substantially rectangularly-shaped arc chute having a pair of spaced inner and outer arcing horns disposed therewithin, a U-shaped blowout magnet surrounding one end of the arc chute and having the legs thereof extending along opposite side walls of the arc chute, a blowout coil for energizing the blowout magnet and electrically connected to the inner arc horn, the coupling between the U-shaped blowout magnet and the inner arc horn being so great that a potential difference exists between the outer ends of the legs of the U-shaped blowout magnet and the outer arc horn in the open circuit position of the interrupter, and a channel-shaped member insulated from the inner arcing horn and at the same potential as the outer arcing horn with the edge portions thereof completely embedded in solid insulation in the region of voltage stress.

20. Circuit interrupting means including a substantially rectangularly-shaped arc chute enclosing the arcing region and having a pair of spaced inner and outer arcing horns disposed therewithin, said rectangularly-shaped arc chute having an internal axis, a U-shaped blowout magnet surrounding one end of the arc chute and having the legs thereof extending along opposite side walls of the arc chute, a blowout coil for energizing the blowout magnet and electrically connected to the inner arc horn, the coupling between the U-shaped blowout magnet and the inner arc horn being so great that a potential difference exists between the outer ends of the legs of the U-shaped blowout magnet and the outer arc horn in the open circuit position of the interrupter, and the outer arcing horn being blade-shaped with the lateral edge portions thereof completely embedded in solid insulation with the insulation extending around the lateral edge portions toward the internal axis of the arc chute on the face of said blade-shaped outer arcing horn nearest the arcing region at least in the region of electrostatic stress.

21. Circuit interrupting means including an arc chute having a stationary and movable contact associated therewith, the movable contact having an arc horn movable therewith, a U-shaped blowout magnet surrounding one end of the arc chute and having the legs thereof extending along opposite side walls of the arc chute, a blowout coil for energizing the blowout magnet and electrically connected with the stationary contact, the coupling between the U-shaped blowout magnet and the stationary contact being so great that potential exists between the outer ends of the legs of the blowout magnet and the movable arc horn in the open circuit position of the interrupter, a pair of relatively stationary static rods, a contact clip electrically connected to the static rods and making contacting engagement with the movable arcing contact near the end of the opening operation, the static rods being disposed laterally of the movable arcing contact in the fully open circuit position of the interrupter, and said static rods relieving the potential stress existing adjacent the movable arcing horn in the fully open circuit position of the interrupter.

22. Circuit interrupting means including an arc chute having a stationary and movable arcing contact associated therewith, the movable arcing contact having a movable arc horn forming an extension thereof, a U-shaped blowout magnet surrounding one end of the arc chute and having the legs thereof extending along opposite side walls of the arc chute, a blowout coil for energizing the blowout magnet and electrically connected to the stationary contact, the coupling between the U-shaped blowout magnet and the stationary contact being so great that potential exists between the outer ends of the legs of the blowout magnet and the movable arc horn in the open circuit position of the interrupter, and a pair of static rods disposed laterally of the movable arc horn and secured to said movable arc horn, for relieving the potential stress adjacent the movable arc horn in the fully open circuit position of the interrupter.

23. Circuit interrupting means including an H-type blowout magnet having an energizing coil wound around the central bight portion thereof, a pair of floating arc horns electrically connected to the terminals of the energizing coil, a stationary contact, a movable arcing contact cooperable with the stationary contact to establish an arc and to lengthen the same, an outer arc horn cooperable with the movable contact to have a terminal of the arc transferred thereto, the coupling between the magnet and one of the floating arc horns being so close as to impress considerable potential between the ends of the pair of leg portions of the H-type blowout magnet and the outer arc horn, and a pair of static rods disposed laterally of the outer arc horn and at the same potential as the outer arc horn to relieve the potential stress adjacent the outer arc horn in the fully open circuit position of the interrupter.

24. A circuit interrupter including a stationary contact and a movable contact cooperable therewith to establish and lengthen an arc, a stationary arc horn associated with the stationary contact, an outer arc horn stationarily mounted and cooperable with the movable contact to have arcing transferred thereto from the movable contact, an H-type blowout magnet having an energizing coil wound about the central bight portion thereof, a pair of floating arc horns connected to the terminals of the energizing coil, and two pairs of static rods associated with the stationary arc horns and disposed laterally of said arc horns to relieve the potential stress between the magnet and the arc horns in the fully open circuit position of the interrupter.

References Cited in the file of this patent

UNITED STATES PATENTS

| | | |
|---|---|---|
| 1,749,539 | Keller | Mar. 4, 1930 |
| 1,879,958 | Tasker | Sept. 27, 1932 |
| 2,337,949 | Walle | Dec. 28, 1943 |
| 2,417,683 | Harlow | Mar. 18, 1947 |
| 2,558,075 | Dickinson et al. | June 26, 1951 |